Jan. 1, 1952 — P. E. SCHMID — 2,580,607
IMPACT TYPE CLUTCH
Filed Oct. 26, 1949 — 2 SHEETS—SHEET 1
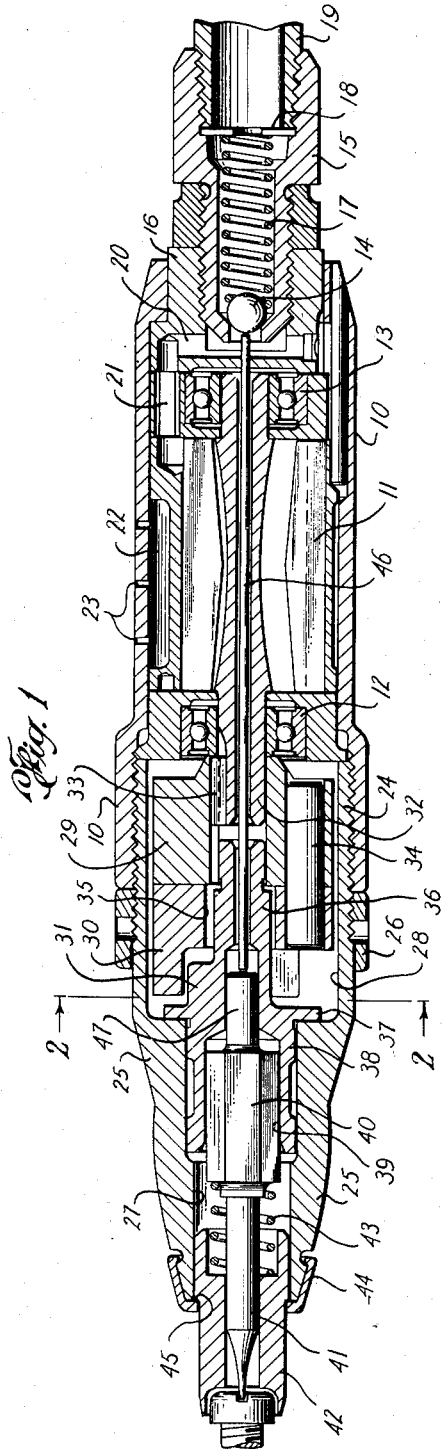
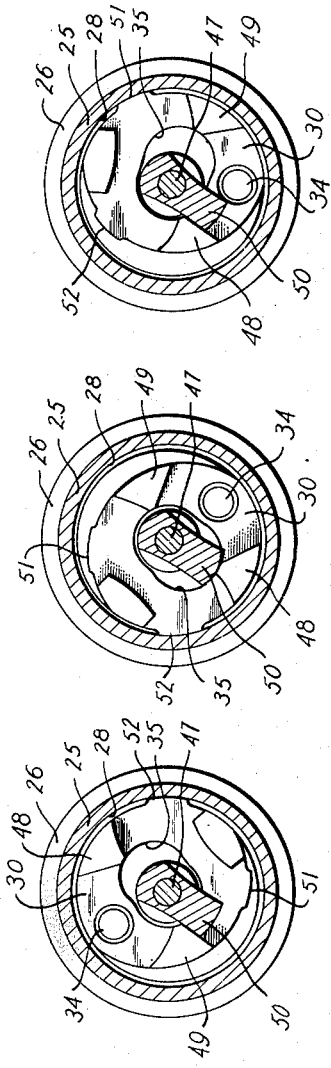
Paul E. Schmid
INVENTOR.
BY
ATTORNEY Jan. 1, 1952        P. E. SCHMID        2,580,607
IMPACT TYPE CLUTCH
Filed Oct. 26, 1949        2 SHEETS—SHEET 2
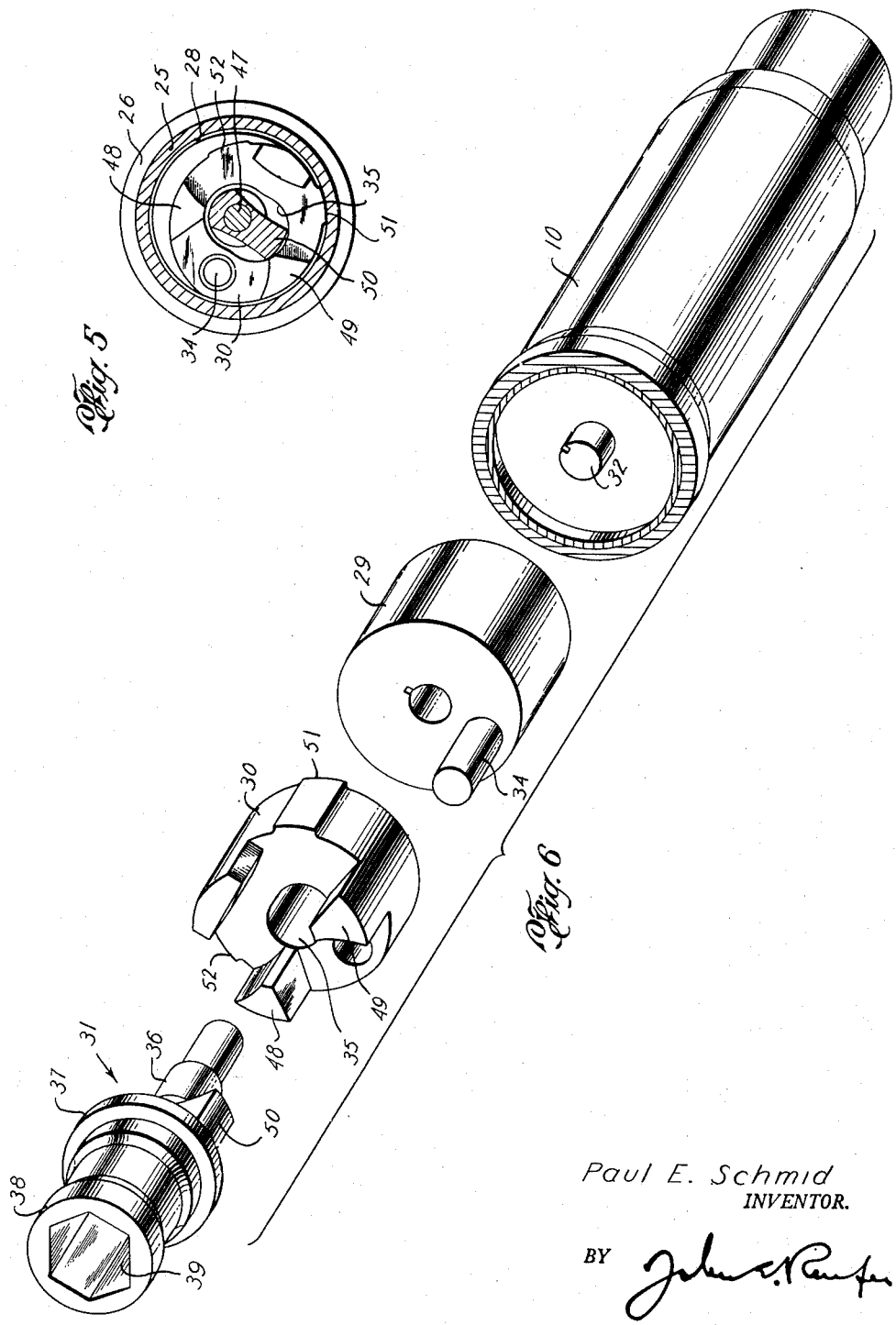
Paul E. Schmid
INVENTOR.
BY
ATTORNEY Patented Jan. 1, 1952

2,580,607

UNITED STATES PATENT OFFICE 2,580,607

IMPACT TYPE CLUTCH

Paul E. Schmid, Houston, Tex., assignor to Reed Roller Bit Company, Houston, Tex., a corporation of Texas Application October 26, 1949, Serial No. 123,764

3 Claims. (Cl. 192—30.5)

This invention relates broadly to impact clutches, but more particularly to portable, fluid actuated rotary tools such as screw drivers, wrenches, nut runners and the like.

One object of this invention is the provision of a novel and improved impact clutch wherein the hammer element is especially designed for coaction with the front housing of the tool in limiting certain movements of the hammer element relative to the impact receiving member, thereby resulting in a simple and efficient construction especially adaptable for small relatively light portable tools such as midget screw drivers and the like.

Another object of this invention is the provision of a novel and improved impact clutch comprising a driving or hammer element having a relatively large moment of inertia and a driven member or anvil having a relatively small moment of inertia, and highly efficient, simple means for causing the driving element to deliver to the anvil a succession of torsional impulses far greater than the maximum torque of the driving mechanism.

The invention resides in certain constructions and combinations and arrangements of parts and further objects and advantages thereof will be apparent to those skilled in the art to which the invention relates from the following description of the preferred embodiment described with reference to the accompanying drawings forming a part of the specification in which similar reference characters designate corresponding parts, and in which:

Figure 1 is a longitudinal sectional view of a portable tool embodying the invention.

Figures 2, 3, 4 and 5 are cross sectional views taken on line 2—2 in Figure 1, looking in the direction of the arrows, and showing parts in different positions.

Figure 6 is an exploded perspective view of the impact clutch and tool shown in Figure 1.

In the embodiment of the invention illustrated in the drawings, the tool comprises a motor casing 10 of cylindrical form in which is operatively mounted a fluid motor 11 of conventional design, which motor is rotatably supported in bearings 12 and 13 carried by casing 10. A ball shaped throttle valve 14 is axially disposed within a fitting 15 screwed into a cap 16 carried by casing 10. Valve 14 is urged toward its seat by a coil spring 17 which bears at one end against valve and at the other against a washer 18 clamped in fitting 15 by a nipple 19. This nipple is adapted to receive a hose connection through which motive fluid, such as compressed air, may be supplied to the tool. When valve 14 is open, motive fluid may flow through passages 20 and 21 to the motor 11, while exhaust takes place through ports, not shown, into groove 22, from which it is discharged to atmosphere through radial ports 23.

The inner end of the casing 10 is internally threaded to receive the corresponding end portion 24 of a front housing 25, which is held against rotation relative to casing 10 by a locking ring 26. Front housing 25 has a central bore 27 extending through the front end portion thereof and opening into a relatively large counterbore or cylindrical chamber 28, which is located within the inner end portion of the housing. In the chamber 28 is accommodated the impact clutch mechanism about to be described in detail, which includes a flywheel or rotatably driving member 29, a hammer element 30 and a cam spindle or anvil member 31.

The motor 11 has its shaft 32 extending beyond bearing 12 into chamber 28, where it is directly connected with flywheel 29 through a key 33. Pressed in the flywheel 29 in offset relation with the shaft 33 but in parallel alignment therewith, there is a pin 34. This pin extends beyond the flywheel and has pivotally mounted thereon the hammer element 30, which is located substantially in axial alignment with the flywheel 29 but is capable of pivotal or oscillatory movement relative thereto on the offset pin 34. The hammer element 30 is also provided with a central bore 35 of elongated or oval shaped cross section, through which extends in spaced relation therewith, the anvil shaft 36 journaled within the flywheel 29 in axial alignment with the rotor shaft 32. The anvil member 31 has an annular flange 37 resting on the bottom of the counterbore or chamber 28, and a cylindrical stem 38 extending therefrom into the front housing 25 where it is rotatably guided. Formed in the stem 38, there is a bore 39 of polygonal cross section in which is slidably mounted the complementary shank 40 of a tool, such as screw driver bit 41. A finder 42 is slidably mounted in the front housing bore 27 and on the bit 41, and is normally urged toward the work engaging end of the bit by a compression spring 43. Finder 42 is retained in front housing 25 by a snap spring 44, which is carried by the front housing and engageable with an external annular shoulder 45 formed on the finder 42.

The ball shaped throttle valve 14 is movable into open position by a rod 46 which extends therefrom through the rotor shaft 32 and ends in the anvil member 31 where it is engaged by the reduced end 47 of the tool shank 40. When the screw driver bit is pressed on the work, the bit will slide inwardly until the shank 40 reaches the bottom of the bore 39. In so doing, it will cause the rod 46 to lift or open the valve 14 against the spring 17. As long as the tool is held on the work, the throttle valve will remain open and the motor operate by the motive fluid admitted thereinto. When the tool is removed from the work, the spring 17 will close the throttle valve and stop the operation of the motor.

As above described, the flywheel 29 is cylindrical or disk shaped and mounted on the motor shaft 32 for rotation therewith through the key 33. The hammer element 30 is substantially disk shaped and driven by the pin 34 for rotation with the flywheel 29 and also for limited pivotal movement relative thereto. Depending from the hammer element 30 and extending toward the annular flange 37 of the anvil member 31, there are two driving clutch jaws 48 and 49, located within substantially 180° and with the pin 34 equally spaced therebetween. Immediately above the annular flange 37, the anvil 31 is provided with a radially extending jaw 50. Formed on the external wall of the hammer element 30, there are two angularly spaced pads 51 and 52 engageable with the inner wall of the front housing chamber 28.

In the operation of the device, if the motor is rotating in the counterclockwise direction in Figures 2 to 5, the hammer element 30, driven by the pin 34, will have its jaw 48 in engagement with the driven jaw 50, Figure 4, for imparting continuous rotation to the anvil 31 and therefrom to the screw driver bit 41. In this instance, the hammer pad 51 is sliding on the inner wall of the chamber 58. Continuous rotation of the screw driver bit 41 will thus take place as long as its resistance to rotation remains below a predetermined maximum. When it exceeds such maximum, the driven jaw 50 will momentarily remain stationary, causing the driving jaw 48 to slide outwardly on the driven jaw, and the consequential pivotal movement of the hammer element from the position in Figure 4 to that in Figure 3, which pivotal movement in a clockwise direction on the pin 34 is limited by the hammer pad 52 engaging the inner wall of the chamber 28. This pivotal movement of the hammer element is made possible without interference from the anvil shaft 36 which extends therethrough by the oval shaped cross section of the hammer element bore 35, which bore, as clearly shown in the drawings, is located lengthwise substantially on an arc having as its center the center axis of the pin 34.

As the hammer element is moved to the position shown in Figure 3, that is, when the driving jaw 48 is moved out of the path of the driven jaw 50, the driving jaw 49 is automatically moved into the path of the driven jaw and caused to contact same and deliver an impact thereon upon about one-half revolution of the hammer element relative to the anvil, as clearly shown in Figure 2. The driven jaw 50 of the anvil 31 will offer resistance to rotation of the flywheel 39, and will act against the jaw 49 to rotate the hammer element in a clockwise direction about the pin 34 until the pad 51 engages the inner wall of the chamber 28. As the hammer element is rotated in the position shown in Figure 2, the jaw 49 will be moved out of the path of the driven jaw 50 as shown in Figure 5, enabling the hammer element to rotate relative to the anvil and also causing the driving jaw 48 to again be moved into the path of the driven jaw 50 for delivering an impact thereto as shown in Figure 4.

It will be noted that with respect to the direction of rotation of the flywheel and hammer element, the driving jaw 48 is behind or trails the driving pin 34 while the jaw 49 is ahead or leads the pin. Upon impact of the jaw 48 on the driven jaw 50, the condition existing is similar to that existing upon impact of the jaw 49 on the jaw 50, except that the moment arm of the impact force about the center of the pin 34 is much shorter for the jaw 48 than for the jaw 49, with the result that the impact delivered by jaw 48 is much greater and has considerable force. Impact of jaw 49 on driven jaw 50 is primarily intended as a resetting blow, through which the hammer element 30 is positively moved or reset into impact delivering position of the driving jaw 48.

The driven jaw 50 and driving jaws 48 and 49 are shaped and located in a manner enabling the aforesaid operation to take place irrespective of the direction of rotation of the motor. In other words, the entire clutch mechanism is reversible, therefore, it is only necessary to use a reversible motor and the tool is suitable for tightening or loosening screws, nuts, bolts and the like. When the drive is reversed, that is, when the motor and flywheel are rotated in the clockwise direction in Figures 2 to 5, it will be understood that the driving jaw 49 will be the primary impact delivering jaw and that the jaw 48 will be secondary or resetting jaw.

From the foregoing description, it will be understood that the pads 51 and 52 are alternately engageable with the inner wall of the front housing chamber 28 for limiting the pivotal movement of the hammer element 30 about the pin 34, thereby eliminating the use of especially designed cages or the like as heretofore found in tools of this type for assuring proper position of the hammer element preparatory to its impact delivering engagement with the anvil.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention herein disclosed.

I claim:

1. In an impact driving connection, the combination of a housing having a cylindrical chamber, a rotatable driving member in said chamber, a rotatable anvil coaxially supported in said housing with respect to said member, a disk shaped hammer element in said chamber pivotally connected to said member for oscillatory movement about an axis offset from but parallel to the axis of rotation of said anvil, said element having jaws extending longitudinally thereof adapted to impact said anvil and effect said oscillatory movement, and pads on said element alternately engageable with the inner wall of said chamber for limiting the oscillatory movement of said element.

2. In an impact driving connection, the combination of a housing having a cylindrical chamber, a rotatable driving member in said chamber, a rotatable driven anvil coaxially supported in said housing with respect to said member, a disk shaped hammer element axially between said member and anvil connected to said member for rotation therewith and pivotal movement relative thereto about an axis offset from but parallel to the axis of rotation of said anvil, a duality of driving jaws on said element extending longitudinally therefrom, a driven jaw on said anvil extending laterally therefrom and adapted to be alternately struck by said driving jaws during normal rotation of said element and effect said pivotal movement, and pads on said element alternately engageable with the inner wall of said chamber for limiting said pivotal movement.

3. In an impact driving connection, the combination of a housing having a cylindrical chamber, a rotatable driving member in said chamber, a rotatable driven anvil coaxially supported in said housing with respect to said member, a hammer element connected to said driving member for rotation therewith and pivotal movement relative thereto about an axis offset from but parallel to the axis of rotation of said anvil, means for effecting the pivotal movement of said element including a striking jaw and a resetting jaw on said element, one located on one side and the other one on the other side of the connection between said element and driving member, said jaws being adapted to alternately strike said anvil during normal rotation of the element for imparting a succession of rotary impacts to said anvil, said striking jaw being located ahead and said resetting jaw behind the connection between said element and driving member with respect to the direction of rotation of said element, and pads on said element alternately engageable with the inner wall of said chamber for limiting said pivotal movement.

PAUL E. SCHMID.

REFERENCES CITED

The following references are of record in the file of this patent:

UNITED STATES PATENTS

| Number | Name | Date |
|---|---|---|
| 2,225,698 | Hutchinson, Jr. | Dec. 24, 1940 |
| 2,408,228 | Richards | Sept. 24, 1946 |